Nov. 20, 1945.  E. F. FLINT  2,389,249

CALCULATING DEVICE

Filed Jan. 6, 1944  3 Sheets-Sheet 1

EDWARD F. FLINT
INVENTOR
BY
ATTORNEYS

Nov. 20, 1945.     E. F. FLINT     2,389,249
CALCULATING DEVICE
Filed Jan. 6, 1944     3 Sheets-Sheet 2

EDWARD F. FLINT
INVENTOR
BY
ATTORNEYS

Nov. 20, 1945.　　　　E. F. FLINT　　　2,389,249
CALCULATING DEVICE
Filed Jan. 6, 1944　　　　3 Sheets-Sheet 3
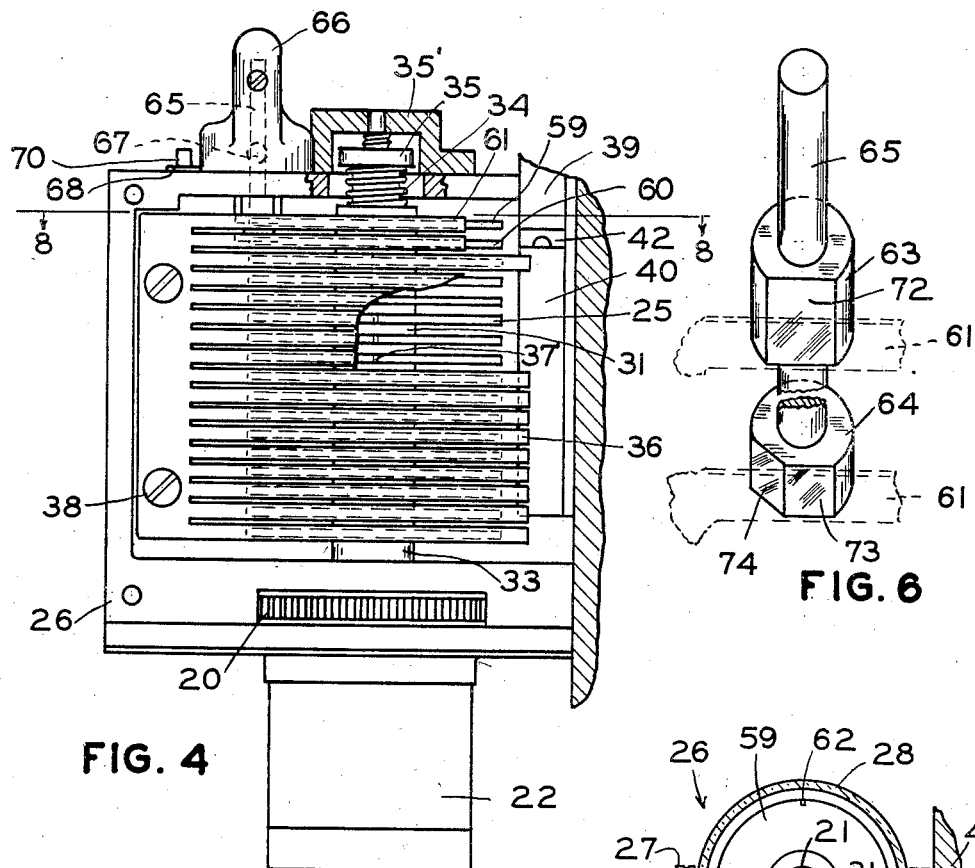
FIG. 4
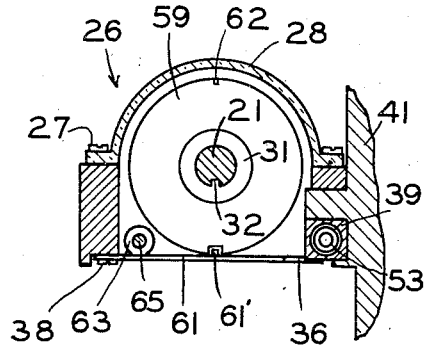
FIG. 6
FIG. 8
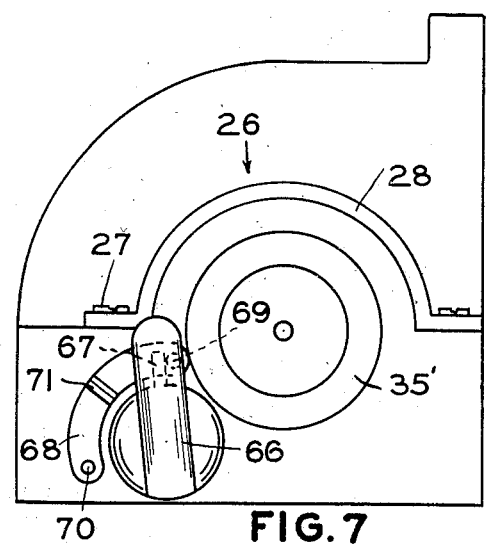
FIG. 7
EDWARD F. FLINT
INVENTOR
BY
ATTORNEYS Patented Nov. 20, 1945

2,389,249

UNITED STATES PATENT OFFICE 2,389,249

CALCULATING DEVICE

Edward F. Flint, Brighton, N. Y., assignor to Bausch & Lomb Optical Company, Rochester, N. Y., a corporation of New York Application January 6, 1944, Serial No. 517,211

5 Claims. (Cl. 33—70)

This invention relates to calculating devices and more particularly to a device for obtaining the mean value of a series of measurements of a single quantity.

The median method of determining a single value, which is representative of the values of a group of measurements, comprises checking off the measurements in an ascending or descending order of magnitude until the medial or middle measurement is reached. For example, in a group of fifteen measurements the median value will be the eighth largest measurement of the group of measurements.

There is disclosed and claimed in my copending application, Serial Number 412,275, filed December 25, 1941, a device for determinating the median of a plurality of successive measurements of an instrument such as an octant. The device of the present invention is an improvement over the device of my copending application in that the median value of a larger number of measurements can be determined with the instrument herewith disclosed and yet the size, weight, and operating mechanism of the device are not materially increased.

The device of my copending application comprises a number of movable indicating members of a number sufficient for each to represent a measurement in the series of measurements of which it is desired to determine the median value. The indicating members comprise discs having an index mark thereon. The discs are normally held in a null position but can be seriately released for movement so that they will be moved by actuation of the operating means of the octant and in a direction and at a magnitude depending on the direction and magnitude of the movement of the operating means of the octant. Thus the relative displacement of the index marks formed on the indicating members will indicate the relative magnitudes of the measurements of the series. In the use of the device after the mark representing the medial measurement of the series has been determined, the indicating members are moved until this mark is aligned with a fiducial line and thereafter the value of the measurement indicated by this mark can be determined from a suitable register which translates the relative value of the mark into terms of quantity units.

In the device of the present invention registering means are provided for registering the relative position of the mark indicative of the median measurement of the first series to the end that the indicating members may be returned to the null position to permit a second series of measurements to be completed, the members being seriately released for a movement during the second series of measurements as in the operation of the device in my copending application.

After the completion of the second series of measurements and after the mark indicative of the medial measurement of the second series has been determined and moved to the position in alignment with the fiducial means, a second registering means is provided for indicating the relative position of the mark representative of the medial measurement of the second series of measurements and a mean value can be found of the two median values represented by the relative position of the two registering means with respect to the fiducial means. Thus it will be seen that it is possible with the device of the present invention to determine the mean value of two medians of two series comprising twice as many measurements as there are indicating members.

In the form of the invention now preferred, the means for indicating the relative position of the mark representative of the medial measurement of either series of measurements comprises a pair of registering discs movable in the same manner that the indicating discs are movable and formed with index marks which are normally held in the null position. The registering discs are seriately releasable for a movement with the indicating discs so that after the medial mark has been determined and moved into alignment with the fiducial line, one of the registering discs can be released. The index mark of this registering disc will now occupy the same relative position as the medial mark and the indicating discs can be returned to the null position and a second series of measurements completed.

After the completion of the second series of measurements and after the mark representative of the median of the second series has been determined and this mark moved into alignment with the fiducial line, the second registering disc can be released. As the index mark of the second registering disc will occupy the same relative position as the medial mark, a mean or an average value can be determined by disposing the index marks of the two registering discs on opposite sides of the fiducial line and equi-distant therefrom.

It is possible if the second of the registering discs has been released and the indicating discs have been returned to the null position to complete a third series of measurements by employing the indicating discs as in the other series of measurements. After the completion of this third series, a medial mark can be found of the marks indicative of the median value of the third series and thereafter the median value of the three series of measurements taken can be found. The relative value of this mark in terms of quantity units can be determined from the register.

The device of the present invention, therefore, permits an observer to take a larger number of measurements than there are indicating discs. This feature of the present invention results in a compact, highly accurate instrument. Other features and advantages of the device of the present invention will be apparent from the following description taken in connection with the accompanying drawings in which:

Fig. 4 is a sectional view taken along line 4—4 of Fig. 3.

Fig. 6 is a perspective view of the mechanism for releasing the registering discs.

Fig. 7 is a top plan view of the median device housing showing the actuating means for releasing the registering discs.

Fig. 8 is a sectional view taken along line 8—8 of Fig. 4.

Figure 1:
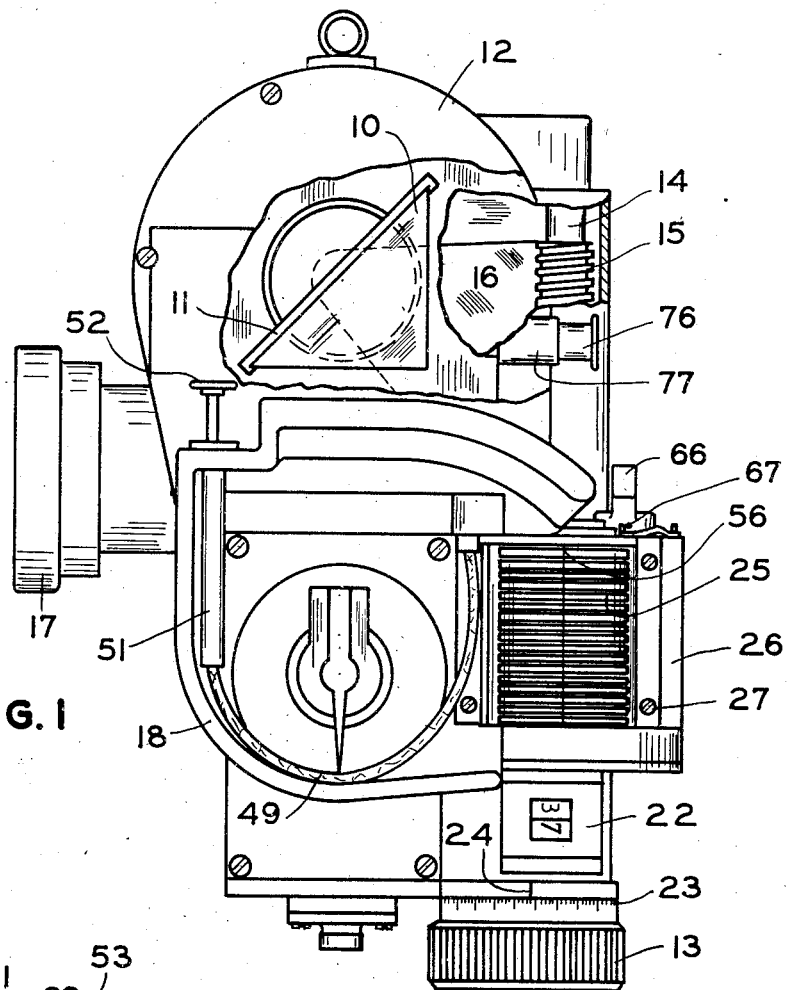
Fig. 1 is an elevational view partly in section of an octant embodying the device of the present invention.
Figure 3:
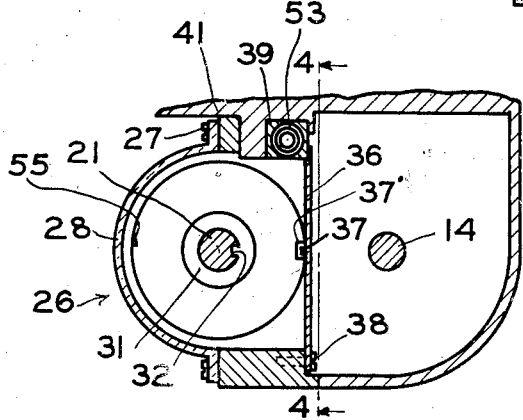
Fig. 3 is a sectional view taken along line 3—3 of Fig. 2.

The device of the present invention, referring now to the drawings, has been illustrated in connection with an octant for measuring the angular elevation of a celestial body but it is to be understood that the device of the present invention may be used in connection with other measuring instruments. In the embodiment of the invention illustrated, referring now to Fig. 1, the octant comprises an index reflector 10 secured in a suitable carrier 11 which is pivotally mounted within the housing 12.

The index reflector 10 is adapted, as will be understood, to reflect light rays from the celestial body observed to the objective of the optical system, which has not been illustrated, of the instrument. The position of the index reflector 10 is adjusted by means of an operating knob 13 fixed to the lower end of a shaft 14. The upper end of the shaft 14 carries a worm 15 which meshes wtih a sector gear 16 connected to the carrier 11 in such a manner that rotation of the shaft 14 will cause the index reflector 10 to pivot about its mounting within the housing.

The knob 13, carried on the underside of the instrument, is intended to be actuated by the left hand as the observer supports the instrument with the ocular tube 17 in front of one of his eyes by grasping the handle 18 with his right hand.

Figure 2:
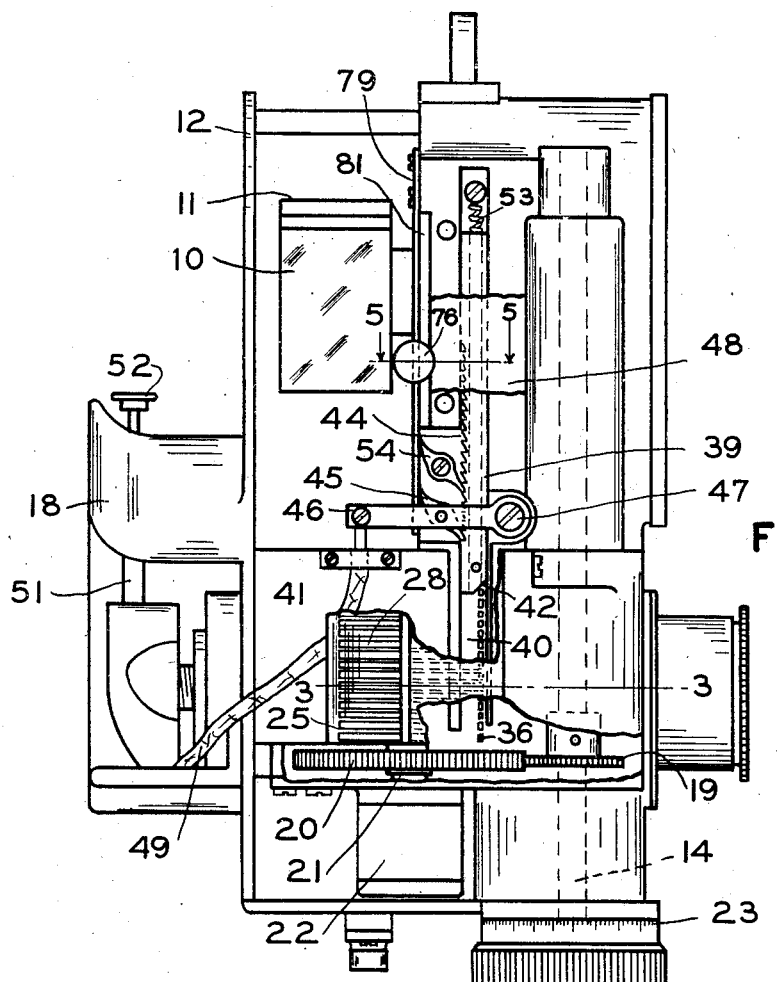
Fig. 2 is a front view of the octant with some portions of the instrument broken away.

The shaft 14, referring now to Fig. 2, carries a gear 19 which meshes with and drives a gear 20 carried by a shaft 21 driving a register 22 calibrated to read in degrees the angular position of the index reflector 10. A suitable scale 23 carried by the operating knob 13 indicates the minutes of the angular positions of the index reflector 10 and as usual in scales of this type an index line 24 is formed on a stationary member adjacent to the scale 23.

In the preferred form of the device of the present invention, the indicating members 25 of the median device are driven by the shaft 21 through the gear train 19 and 20. The indicating members, as well as the other mechanisms of the median device, are mounted within a suitable housing 26 secured by the screws 27 to the one face of the housing 12. The housing 26 is provided with a transparent window 28 to permit an observer to view the indicating members.

The indicating members 25, in the form of the invention illustrated, comprise discs, which while loosely mounted upon the shaft 21, are normally held thereon for rotation therewith by a plurality of friction washers 31 carried by the shaft 21 intermediate the indicating discs 25. Each washer is provided with a lug or projection 32 which cooperates with a longitudinal groove formed in the shaft 21 and keys each washer to the shaft. The hub 33 of the gear 20 serves as a washer at one end of the shaft and takes the thrust of the disc assembly created by a spring 34 carried by the shaft 21. The spring 34 seats on a collar 35, carried within a cap 35' which journals the one end of the shaft 21, and acts against the uppermost washer 31 as viewed in Fig. 4. The friction between the discs 25 and the washers 31 should be such as to cause the discs to rotate with the washers as the shaft is rotated. It is to be noted, however, that the engagement between the shaft and each disc 25 is of such a nature that the shaft may be rotated relative to any disc which is held in a fixed position.

The discs are normally held against rotation with the shaft by a plurality of spring arms 36 projecting from an integral base member. Each arm carries a finger 37 which when received in a notch 37' of a disc will hold the same against rotation with the shaft 21. The integral base of the spring arms 36 are fixed to the casing by screws 38 while the outer ends thereof project into the path of movement of a slide 39 operating in a guide or channel 40 formed in the wall 41 of the housing 12, seen in elevation in Fig. 2 of the drawings. The slide 39 is formed at the one end thereof with a cam surface 42 which is adapted upon engagement with the spring arms 36 to cam the same to a position in which the fingers 37 thereof are moved out of engagement with the notches 37' of the discs 25.

In the use of the median device of the present invention, the indicating discs 25 are to be freed for rotation with the shaft 21 in a consecutive order, beginning with the uppermost disc 25 as viewed in Figs. 1 and 2, and working downwardly until all of the discs have been freed for rotation.

To move the slide 39 downwardly of the instrument and seriately release the discs, the one surface of the slide 39 is formed with a plurality of teeth 44 engaged by a spring pressed pawl 45 rotatably mounted on a lever 46 having one end pivotally mounted at 47 to the housing 12. The free end of the lever 46 projects through a slot formed in a plate 48 covering the slide 39 and has fixed thereto one end of a flexible cable 49 extending around the interior surface of the handle 18. A tube 51 extending downwardly from the top surface of the handle 18 houses a spring, not shown, for normally holding a small plunger 52 in an elevated position. The plunger is connected to the opposite end of the flexible cable 49 and it may be pressed against the action of the spring to move the cable 49 and rock the lever 46. Movement of the plunger is limited to that necessary to rock the lever 46 a distance sufficient to cause the pawl 45 to move upwardly as viewed in Fig. 2, a distance equal to one tooth on the slide 39.

As a spring 53, having one end fixed to the casing 11 with the opposite end connected to the slide 39, tends to hold the latter in an elevated position, a second spring pressed pawl 54 is provided for holding the slide 39 against upward movement as the pawl 45 is moved out holding engagement with one of the teeth 44 upon actuation of the lever 46. It will thus be seen that through the mechanism just described, the indicating discs 25 can be seriately released for movement with the shaft 21 by successive depressions of the plunger 52.

In the use of the device of the present invention, the observer after sighting the instrument on a celestial body, actuates the operating knob 13 until the image of the body formed by the optical system of the instrument is brought into coincidence with a datum plane such as the bubble of a liquid bubble level forming an artificial horizon, or the natural horizon, depending on the conditions under which the instrument is used. After coincidence has thus been made, he depresses the plunger 52 to release the uppermost disc 25 for rotation with the shaft 21 which is driven through the gear train 19 and 20 from the shaft 14 carrying the operating knob 13. On the next manipulation of the operating knob 13 to again bring the image of the body into coincidence with the datum plane, the released disc will move with the shaft 21 commensurate with the amount of movement of the operating knob 13 necessary to bring the observed body into coincidence with the artificial or natural horizon. As the released disc will rotate with the shaft during the second observation, any point or reference on the first indicating disc will be displaced from its initial position by an amount proportional to the movement of the shaft 21 for the second observation. The second reading being completed, the operating knob 13 is again actuated and after coincidence has been obtained, the plunger 52 is again depressed to release a third disc for movement with the shaft 21, the plunger 52 being depressed immediately following the making of each observation of the series to unlock or release the indicating member corresponding to that observation.

The indicating discs 25 in the form of the invention now preferred are used to register the relative magnitude of the observations made and to this end each disc carries an index mark 55. The mark may comprise any discernible indicator desired, such as a small groove or notch carrying a filler of some material of a color which will contrast with the color of the disc. If desired, the filling material could be a luminous paint containing some radium so that the mark would be readily seen in the dark.

The marks are so formed on the discs 25 that they are in alignment when the discs are locked against movement and in the illustrated form of the device are disposed behind a fiducial line 56 formed on the transparent window 28 of the housing 26.

It will be seen now that upon release of the first disc 25, the index mark 55 thereof will be moved out of alignment with the remainder of the index marks by rotation of the shaft 21 through operation of the knob 13 in completing the second operation. When the second disc is released, the relative position between the index mark of the first disc and that of the second disc is maintained upon rotation of the shaft 21 since both the first and second discs will move or rotate together. In fact, as will later become apparent, any index mark which has been displaced from its initial alignment will throughout the remaining operation of the median device maintain its relative displacement with respect to the index mark on the next adjacent disc after this disc has been released for rotation with the shaft 21. Thus, the relative displacement between the first and second index marks will remain unchanged from that which existed between the marks after the second observation and while the second index mark was in its initial or aligned position. It hence follows that the separation of these two marks is a measure of the difference between the first and second observations and that the first index mark may be considered as representing the first observation and the second index mark the second observation.

As the first disc is not released until after the first observation has been made, there is no necessity for an observer to consult the register 22 and it is immaterial where the register and hence the reflector 10 is set prior to any series of observations.

After the last disc has been released for movement with the shaft 21, any movement of the same will displace all of the discs relative to their initial position of alignment by equal amounts so that their relative positions with respect to each other will remain unchanged. Thus the displacement between any two index marks whether they are adjacent or not, will be a measure of the difference in the value of the reading which the particular marks represent.

It will now be apparent that the ratio between the gears 19 and 20 is immaterial to the operation of the device. However, the maximum displacement of any index mark 55 when moved from its initial position will depend on this gear ratio. This ratio is preferably selected to accommodate the maximum displacement to be normally expected for any mark in order that each index mark may be observed through the window 28 after it has been displaced from its initial position.

The determination of the median value of the observation or measurement, the relative magnitudes of which are represented by the relative positions of the index marks 55, is made by merely ascertaining which mark is disposed in the middle of the series of marks. That is, which mark is positioned so that half of the remaining marks are disposed on one side of the same and the other half on the opposite side. In the device illustrated, fifteen discs have been shown and the medial mark representing the median value of the observations represented by the mark will be the eighth mark in either ascending or descending order of magnitude. When the medial mark has been determined, the operating knob 13 is actuated until the medial mark is brought into coincidence with the fiducial line 56. As the register 22 is driven by the shaft 21, the register will also be operated by actuation of the knob 13 and the latter will indicate directly the value of the median of the observations in degrees.

It is possible for unequal numbers of index marks to be located on opposite sides of the fiducial line if several of the index marks are in alignment after completion of a group of measurements. In this instance, the same procedure is followed by counting from one extreme to the fifteenth index mark. The fact that several marks may be aligned is immaterial and they are counted as separate marks. Should one or more index marks be in alignment with the eighth or medial mark, they are also set on the fiducial line in evaluating the median.

To permit an observer to take a larger number of measurements than there are discs 25, means are provided in the present invention for registering the position of the mark determined by its relative position to indicate the median of the first series of measurements so that the indicating discs can be returned to and locked in the null position after which they can be again seriately released as the measurements of a second series are made.

In the form of the invention illustrated, the means for registering the position of the mark determined to be the medial mark, referring now to Fig. 4, comprises a pair of registering discs 59 and 60 similar to discs 25 and mounted on the shaft 21 in the same manner as are the discs 25. The discs 59 and 60 are normally held against rotation by spring arms 61 somewhat shorter than the arms 36 and which carry fingers 61' similar to the fingers 37 for engaging notches formed in the edges of the discs. Each of the registering discs carries an index mark 62 which may be formed by filling in a small groove or notch cut in the edge thereof with some material of a color different than that of the material used to form the index marks 55 so that they can be distinguished from the latter marks.

It should be noted that as the retaining arms 61 are shorter than the arms 36, movement of the slide 39 will not release the arms 61. The registering discs 59 and 60 are released for movement with the shaft 21 through a pair of spaced cams 63 and 64 carried by a shaft 65 journaled in the wall of the housing 26. The shaft 65 carries at the outer end thereof a handle 66 to permit the shaft to be readily rotated by the observer. The handle carries a small pin 67 projecting laterally therefrom and which sweeps over a spring retaining member 68 as the handle is moved. The member 68 is held on the top of the housing 26 by a pair of upstanding pins 69 and 70 which act as limit stops. The member 68 is provided with a notch 71 intermediate the opposite ends thereof which forms a flexible stop between the fixed stops formed by the pins 69 and 70. When the handle is in the position shown in Fig. 7 with the pin 67 engaging the stop formed by the pin 69, the cams 63 and 64 are in the relative position shown in Fig. 6. It will be seen that the cam 63 is formed with a flat 72 which is in facewise engagement with the one surface of the arm 61 which holds the disc 59 against rotation and that the flat 73 of the cam 64 is engaging the retaining arm for the disc 60. The flats are such that the retaining arms will be in a position to hold the discs against rotation as long as the flats are in engagement with the arms. However, when the shaft 65 is rotated counterclockwise as viewed in Fig. 6, the flat 72 of the cam 63 is moved out of engagement with the arm 61 and the latter is cammed outwardly to bring about a disengagement of its finger with the notch of the disc 59. This disengagement as should now be understood, frees the disc 59 for rotation with the shaft 21.

As the cam 64 is formed with a flat 74 adjacent the flat 73 counterclockwise movement of the shaft 65 sufficient to move the pin 67 into the notch 71 will not free the disc 60 as the flat 74 will permit the retaining arm to remain in the position in which it will hold the disc 60 against rotation. Continued rotation of the shaft 65 through manipulation of the handle 66, however, sufficient to move the pin 67 into engagement with the stop formed by the pin 70, will bring the high curved face of the cam 64 into engagement with the arm and the latter will be forced outwardly of the disc 60 and the latter will then be free to rotate with the shaft 21.

In the use of the device of the present invention, after a series of measurements has been completed and the medial mark determined and moved into coincidence with the fiducial line 56, the handle 66 can be manipulated to release the registering disc 59. As the registering disc 59 has been held in the null position with its index mark underlying the fiducial line 56, the index mark of this disc will occupy the same relative position as the mark determined to be the medial mark of the series of marks indicative of the measurements made regardless of movement of the shaft 21.

Figure 5:
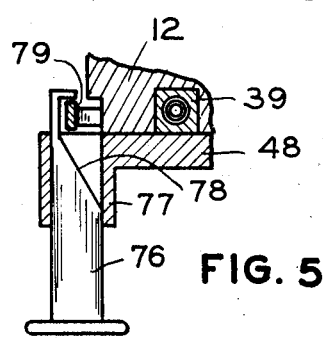
Fig. 5 is a sectional view taken along line 5—5 of Fig. 2.

To permit the indicating discs to be again used to indicate a second series of measurements, means are provided for returning these discs to the null position. This means, in the illustrating embodiment of the invention, comprises a plunger 76, which as best illustrated in Fig. 5, is slidably mounted in a small tubular casing 77 carried by the plate 48. The plunger is normally held by some suitable resilient means such as a spring, not shown, in the position illustrated in Fig. 5. The inner end of the plunger is cut away to form a cam surface 78 which is moved into engagement with a leaf spring 79 having one end fixed within the upper portion of the housing and extending downwardly therefrom a distance sufficient to engage the pawls 45 and 54. Cam 78, upon inward movement of the plunger 76, urges the leaf spring 79 to the right as viewed in Fig. 5, the housing being cut away at 81 to permit the spring 79 to be forced over a distance sufficient to move the pawls out of engagement with the teeth 44 of the slide 39, whereupon the spring 53 moves the slide 39 back to its original position. This movement of the slide 39 permits the spring arms 36 to return to their normal position or at least to a position in which the fingers 37 thereof engage the peripheral surfaces of the discs 25. With the spring arms 36 in this position, rotation of the shaft 21 through actuation of the operating arm 13 will rotate the discs 25 until the notches 37' formed therein are brought opposite the fingers 37 to permit the fingers to snap into the notches and again hold the indicating discs against rotation with the shaft 21. It will be understood that the return movement of the slide 39 will not affect the registering disc 59 and this disc will be still free to rotate with the shaft 21.

The instrument is now reset and a second series of observations can be completed and the indicating discs again used as in the first series of measurements. After the second series of measurements has been completed and the medial mark determined and moved into coincidence with the fiducial line 56, the registering disc 60 is released by means of handle 66 so that disc 60 will move with the shaft 21. It should be obvious now that the index mark of the disc 60 will register the position of the mark indicative of the median value of the measurements of the second series. The indicating discs 25 can be again returned to the null position through actuation of the plunger 76 as previously explained. The index marks of the registering discs 59 and 60 will, however, hold the relative position of the median marks of the two series of measurements and an average or mean value can be found of the median values of the two series by merely positioning the fiducial line 56 in a central position relative to the marks of the registering discs.

Thus it will be seen that the device of the present invention will permit an observer to determine the median value for each of two series of fifteen readings and an average of the two median values and yet the device is not complicated or cumbersome.

It is possible to use the device to determine the median of the median values of three series of fifteen measurements each, for after the indicating discs have been returned to the null position for the second time, a third series of measurements can be made, the device being operated as heretofore explained. After the third series of measurements has been completed and the medial mark determined, the indicating discs can be moved until this medial mark is disposed beneath the fiducial line. With this mark underlying the fiducial line, the latter can be taken as a mark and there is no difficulty in determining which of the three marks is the medial mark. It will be understood that actually the medial mark, when determined, will represent the medial mark of the median values of three series of measurements taken and the value of the measurement indicated by this mark in quantity units can be determined from the register 22.

It will also be obvious that even a larger number of measurements can be handled by the instrument by merely increasing the number of registering discs and that the number of registering discs which can be employed is limited only by the practical size of the device. It is to be understood, therefore, that while the present preferred embodiment of the invention has been illustrated and described herein, the invention is not to be limited thereby for it is susceptible of changes in form and detail within the scope of the appended claims.

I claim:

1. A device for determining the mean of the median values of at least two series of measurements of a quantity comprising operating means movable for making the measurements, means operatively connected to said operating means for determining the median value of each series of measurements, registering means operatively connected to said operating means for registering the median values of the respective series of measurements, and means cooperating with the registering means for determining the mean of the median values registered.

2. A device for determining the mean of the median values of at least two series of measurements of a quantity comprising operating means movable for making the measurements, means operatively connected to said operating means for determining the median value of each series of measurements, registering means operatively connected to the operating means for registering the median values of each series of measurements, said registering means comprising members mounted to move with said operating means, means for locking said members against movement and means for releasing said members, and means for determining the mean of the median values from the relative positions of said members.

3. A device for determining the mean of the median values of at least two series of measurements of a quantity comprising operating means movable for making said measurements, indicating means movable in accordance with the movement of the operating means to indicate the relative values of the measurements made in each series, means for determining the median value of the measurements of each series from the relative positions of the indicating means, registering means operatively associated with the operating means for registering the median value of the first series of measurements while the second series of measurements is being made, said registering means also including means for registering the median value of the second series of measurements, and means for determining the mean of the median values of the two series of measurements from the relative positions of the registering means.

4. A device for determining the mean of the median values of at least two series of measurements comprising operating means movable for making said measurements, a plurality of movable indicating members normally held in a null position and operatively connected to the operating means, means for seriately releasing the indicating members whereby they are moved by and in accordance with the operating means, said indicating members being constructed and arranged to indicate independently the value of each measurement of each series, means for determining the median value of each series of measurements from the relative positions of the members, registering means operatively connected to the operating means for registering the median value of the first series while the median value of the second series is being determined, and means cooperating with the registering means for determining the means of the median values of the two series of measurements.

5. A device for determining the mean of the median values of at least two series of measurements of a quantity comprising operating means movable for making the measurements, said means including a rotatable shaft, a plurality of discs carrying indicia mounted on the shaft to move therewith in accordance with the movement of the operating means, means for locking the discs against movement with the shaft, means for seriately unlocking the discs as each measurement is made, means for determining the median value of a series of measurements by the relative positions of the indicia on the discs, an additional disc mounted on said shaft to turn therewith, means for locking the additional disc against movement with the shaft independently of the first named locking means, whereby the additional disc is movable to indicate the median value of the first series of measurements while the first named discs are locked and then released for determining the median value of the second series of measurements, a second additional disc carried by the shaft for registering the median value of the second series and means for determining the mean value of the median values of the two series of measurements by the relative positions of the additional disc and the second additional disc.

EDWARD F. FLINT.